Aug. 25, 1931.  G. BONTEMPI  1,820,524
MACHINE FOR THE PRODUCTION OF ARTIFICIAL FLOWERS
Filed Sept. 12, 1928  5 Sheets-Sheet 1

Inventor
Giuseppe Bontempi
By his Attorney

Aug. 25, 1931.    G. BONTEMPI    1,820,524
MACHINE FOR THE PRODUCTION OF ARTIFICIAL FLOWERS
Filed Sept. 12, 1928    5 Sheets-Sheet 2

Inventor
Giuseppe Bontempi
By his Attorney

Aug. 25, 1931.  G. BONTEMPI  1,820,524
MACHINE FOR THE PRODUCTION OF ARTIFICIAL FLOWERS
Filed Sept. 12, 1928   5 Sheets-Sheet 4

Inventor
Giuseppe Bontempi
By his Attorney

Patented Aug. 25, 1931

1,820,524

UNITED STATES PATENT OFFICE

GIUSEPPE BONTEMPI, OF NEW YORK, N. Y.

MACHINE FOR THE PRODUCTION OF ARTIFICIAL FLOWERS

Application filed September 12, 1928. Serial No. 305,374.

This invention relates to the manufacture of artificial flowers and more particularly refers to improvements in machines for the forming and shaping of blanks such as are generally used in producing petals of flowers having a structure composed of radially directed elements, such as chrysanthemums, asters, etc.

The primary object of this invention is to provide a machine for the curling and forming of artificial flower blanks composed of a plurality of radially extending elements, whereby an entire blank can be formed at one stroke of the machine under conditions closely duplicating the operations which are now performed by hand.

Another object of the invention is to provide a machine of the character specified, in which means are provided for adjusting the pressure exerted by the tools against the blank according to the nature of the flower to be produced and according to the number of tools actuated at the same time.

A further object is to provide a machine for the curling and forming of artificial flower blanks, permitting of producing all the necessary movements, including the heating of the tools required by a single stroke of an operating lever requiring no special skill or experience on the part of the operator.

Other objects and advantages of the present invention will more fully appear as the description proceeds and will be set forth and claimed in the appended claims.

The blanks generally employed for the manufacture of artificial flowers of the character specified, are generally in the form of segmental pieces of fabric cut to produce a number of elongated radially arranged pointed petals. These blanks are made ready for assembling to make a complete flower by pressing and moving a heated edged tool along the center line of each petal, the blank being previously placed upon a platen of a yielding or resilient character.

The combined heat and pressure cause a curling up of each petal which more or less produces the desired effect according to the skill and experience of the operator.

Although the results thus obtained are fairly satisfactory, the operation consumes a great deal of time and therefore the finished product entails a rather high cost of production. It is obvious that this cost would be considerably reduced if a number of petals could be curled and formed at the same time. The machine to which this invention refers has been particularly designed with this object in view and therefore the reduction of the cost of production is one of the main advantages afforded thereby.

Various embodiments of my invention are illustrated in the accompanying drawings, in which.

An embodiment of my invention is illustrated in Figs. 1 to 5. In the simple form illustrated in said figures, the device essentially comprises means for producing inward radial movement under pressure of a segmental series of heated tools preferably of the rolling type; said tools being capable of curling or forming the radially disposed leaves or petals of an artificial flower blank such as illustrated in Fig. 6.

The device also comprises means for retaining the curling tools in their contracted position at the end of their stroke permitting the withdrawal of said tools from the curled blank, and means for once more forcing said tools to their extended position after they have been moved a sufficient distance from the bed of the device.

The operating mechanism is preferably so designed that the tools and the frame carrying the same when in their inoperative position are arranged with the tools proper exposed to the action of a source of heat, leaving however, a clearance between said tools and frame and the bed of the machine sufficient to permit free removal of the formed blank and replacement of a new blank.

Figure 1:
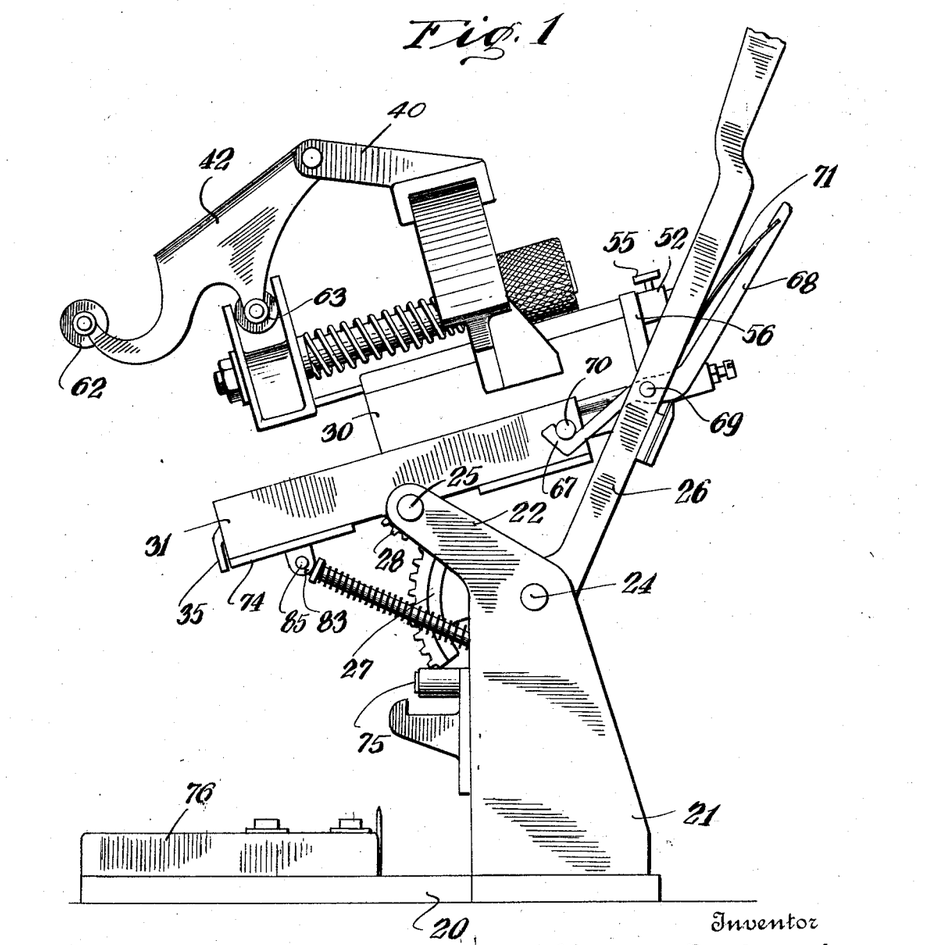
Fig. 1 is a side view in elevation of a machine adapted to handle flower blanks segmental in shape.
Figures 2, 5, 6:
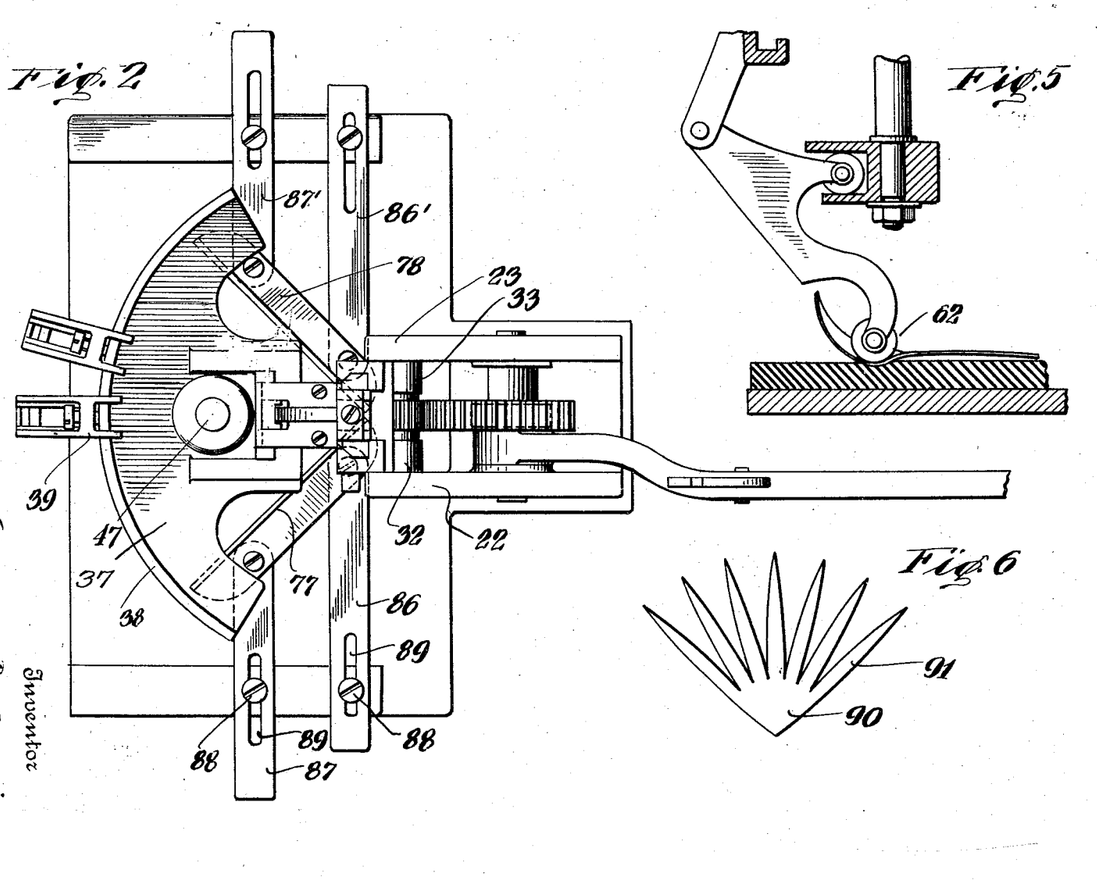
Fig. 2 is a plan view thereof.
Fig. 5 is a detail side sectional elevation illustrating the tool carrying arms at an intermediate position of their radial movement.
Fig. 6 is a plan view of a segmental blank adapted to be finished by means of the machine illustrated in Figs. 1 to 5.
Figures 3, 4:
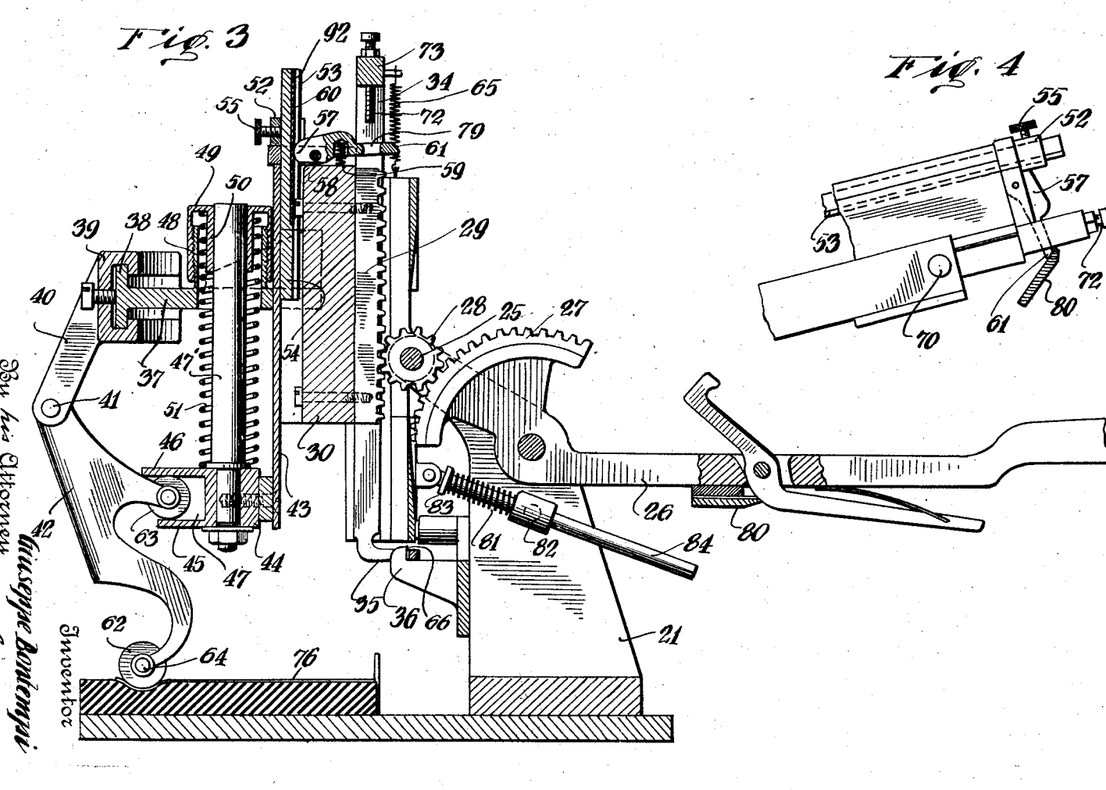
Fig. 3 is a cross sectional elevation of the same.
Fig. 4 is a detail side view in elevation of the tool releasing mechanism.

Referring to said figures, the machine comprises a base or bed plate 20 on which is mounted an upright frame 21, terminating at the upper end with two spaced arms 22, 23. At the base of said arms is mounted a horizontal pivotal shaft 24 and at the end of said arms is mounted another horizontal pivotal shaft 25. The machine is operated by means of a lever 26 pivotally mounted on shaft 24, made integral with a geared segment 27. Said segment is in mesh with an idle pinion 28 mounted on shaft 25 and said pinion in its turn intermeshes with rack 29 which forms part of a carriage 30 mounted for longitudinal travel in relation to a frame 31 within which said carriage is slidably mounted.

Frame 31 is in its turn provided with two ears or lugs 32, 33 (see Fig. 2) loosely mounted on shaft 25 permitting tilting movement of said frame about said shaft.

Within frame 31 is also slidably mounted a plunger 34 which is longitudinally movable both in relation to said frame and in relation to carriage 30. At the lower end, said plunger is bent inwardly to form an extension 35 having an opening the rear end of which when the device is in its working position shown in Fig. 3, interlocks with a lug 36 carried by frame 21 and acts as a lock, retaining frame 31 in its vertical position shown, and preventing tilting movement thereon about its pivotal support 25.

A segmental plate 37, preferably provided with a segmental rim 38, extends from carriage 30 to which it is attached, to the front thereof. In the machine illustrated, the rim 38 extends about 60° on either side of the central line of the machine and forms a support for a plurality of brackets 39 each one of which is formed with a downwardly and outwardly directed arm 40 providing a pivotal point of attachment 41, for the radially movable tool holders 42.

The position of brackets 39 can be adjusted along rim 38 according to the angular position of the leaves or petals of the blank to be operated upon as will be explained later.

At the front end of carriage 30 is mounted a longitudinally sliding plate 43, the lower end of which carries a pressure member 44 which is provided with two vertically spaced parallel segmental ribs 45, 46, forming a segmental groove 47 concentric to segmental rim 38.

Said pressure member is mounted underneath plate 37 and is movable longitudinally of carriage 30 by virtue of the sliding relation of plate 43 to said carriage.

Member 44 is provided with a pin 47' upwardly projecting through a threaded sleeve 48 upwardly extending from plate 37; and a nut 49 provided with a hub 50 through which pin 47' may project, may be screwed more or less over sleeve 48 so as to increase or decrease the tension of a pressure spring 51 interposed between the upper surface of member 44 and the inner surface of nut 49.

The action of said spring is to force member 44 away from plate 37; the distance between said member and said plate however, can be regulated by a stop 52 carried by the upper end 53 of a plunger 54 attached to or integral with plate 43, said stop being slidable along plunger 54 and being fixed at the desired position by means of a set screw 55.

Therefore when spring 51 is in its fully extended position as permitted by stop 52, said stop abuts against the upper end of carriage 30.

When pressure member 44 is forced upwardly against the action of spring 51, its movement will be transmitted to plate 43 and plunger 54. The upward movement of plunger 53 is permitted by a cam surfaced dog 57 pivotally mounted onto the top of carriage 30 at 58; but when the movement of plunger 53 is terminated, the cam surface of dog 57 which is urged to rotate in a counterlockwise direction with reference to Fig. 3 by a spring 59, bears against surface 60 of plunger 53 and tends to oppose its return movement.

By virtue of this arrangement when pressure member 44 is forced upwardly, compressing spring 51, and is then released, spring 51 may extend to a limited extent, but as soon as the braking action of cam dog 57 becomes effective, the return movement of pressure member 44 due to the expansion of spring 51 will be checked.

However, by depressing the outer end 61 of dog 57 its pressure against surface 60 will be released and spring 51 will once more be free to force pressure member 44 to its extreme position away from plate 37.

The tool holders 42 are in the form of arms carrying at the outer end the tool proper 62 having the form of a disk with a fairly sharp edge, and carrying at an intermediate point, a roller 63 which is inserted within groove 47 on pressure member 44.

The radius of groove 47 is smaller than the radial distance of pivots 41 from the center of segmental rim 38, and therefore roller 63 of each arm 42 is inwardly displaced from a line connecting the center of pivot 41 with the center of shaft 64 of circular tool 62.

As a result, when the carriage is in its raised position shown in Fig. 1, groove 47 acts as a positioning means for rollers 63, and arms 42 will be maintained at a definite angle due to the definite relation existing between the position of pressure member 44 and that of pivots 41.

As the drawings clearly show, levers 42 are thus inclined inwardly, so that the distance between the center of rollers 62 and the axis passing through the center of segmental rim 38 is less than the distance between said axis and the centers of pivots 41.

Referring to Fig. 3 therefore, it is seen that when tilting frame 31 is in its vertical position any tendency to lower carriage 30 and parts 37, 39, 40 carried thereby will result in a tendency of arms 42 to move inwardly about their pivots 41.

At the start of this movement, it will be seen that for each arm 42, the position of roller 63 is somewhat closer to the axis of segmental rim 38 than that of tools 62, and the reason for this will be apparent later.

As stated before, plunger 34 is slidable within tilting frame 31 both in relation to said frame and to carriage 30; a tension spring 65 attached to the upper end of plunger 34 and to frame 31 tends at all times to move plunger 34 inwardly, but a stop (not shown) limits the inward stroke of plunger 34 in relation to frame 31 to an amount such as represented by the clearance 66 separating extension 35 from the lower end of frame 31 when said extension 35 interlocks with lug 36 as shown in Fig. 3.

On the other hand, the upper stroke of plunger 34 is limited by said clearance which is just sufficient to permit extension 35 to become disengaged from lug 36. If desired, spring 65 can be dispensed with because plunger 34 may be forced to its locking position by carriage 30 at the beginning of the downward stroke of said carriage due to the frictional engagement existing therebetween.

When the device is in its position of rest shown in Fig. 1, the tools 62 are raised a considerable distance from the bed 20 and tilting frame 31 occupies a rearwardly inclined position. At this stage the operator can freely insert a hand over the bed plate of the machine in order to remove a finished blank and replace a new one, and tools 62 are directly exposed to the heat generated by some suitable means not shown.

While the tools are thus made ready for the next operation therefor, the operator removes the finished work and places a new blank in position, as stated. In said position, lever 26 has been tilted to its extreme raised position, and the hook formed end 67 of a locking lever 68 pivotally mounted on lever 26 at 69 engages and retains a pin 70 laterally projecting from frame 31, locking both lever 26 and frame 31 in position.

Lever 68 is retained in its locking position by a leaf spring 71, but by depressing said lever 68 its hook shaped portion 67 becomes disengaged from pin 70 and on account of its weight the entire frame 31 together with parts carried thereby tends to tilt downwardly in a counterclockwise direction about pivot 25.

However, if lever 26 is prevented from tilting downwardly about its pivot 24 in a clockwise direction, by exerting upon it a force tending to rotate it in a counterclockwise direction, geared section 27 will prevent the rotation of pinion 28 in a counterclockwise direction and will in fact create a tendency in said pinion to rotate in a clockwise direction retaining carriages 30 in its upward position in relation to frame 31.

When said carriage 30 is in its upward position, the upper surface of rack 29 abuts against the lower end of an adjustable screw 72, depending from the upper yoke portion 73 of plunger 34; so that plunger 34 also is held in its extreme upward position with its extension 35 abutting against the lower end of frame 31, as shown in Fig. 1; the result is that frame 31 itself is prevented from tilting downwardly about pivot 25.

If, on the other hand, lever 26 is allowed to gradually tilt downwardly to a position close to the horizontal, pinion 28 will be rotated by segment 27 in a counterclockwise direction but whatever movement said pinion may tend to transmit to rack 29 is counterbalanced by the fact that said rack develops about the surface of the pinion by rotating about pivot 25 due to the tilting movement of frame 31 about said pivot in a counterclockwise direction.

Said frame 31 will continue to tilt downwardly until its rear surface 74 strikes stops 75 inwardly projecting from upright 21, said stops being preferably of a shock absorbing nature.

At this point a slight further depression of lever 26 will cause, through segment 27 and pinion 28, a translatory downward motion of rack 29 and carriage 30 sufficient to permit spring 65 to force downwardly plunger 34, thus causing extension 35 to engage lug 36, locking frame 31 in position. Continued downward motion of lever 26 will result in carriage 30 being moved further down until the lower edge of tools 62 strikes the upper face of a platen 76.

The curling of petals of artificial flower blanks is now generally performed by pressing a hot tool preferably of the rolling type against the middle line of each petal and running said tool along said middle line practically for the entire length thereof, said blank being placed upon a relatively soft surface such as that of rubber or felt, and the pressure to form the petal being exerted against said surface.

During the operation therefore, the tool forces the central line of the petal within the temporary depression formed through the yielding surface underneath due to the pressure exerted on the tools, and the finished petal comes out curled by the heat of the tool and with a longitudinal central depression representing the central rib of the petal.

My machine is designed to exactly reproduce these conditions, and therefore platen 76 is made of fairly thick felt or rubber, the blank which is segmental in shape being placed in the right position by forcing its edges against guiding plates or gauges 77, 78, between which platen 76 is inserted.

After the lower edge of tools 62 has reached the upper surface of platen 76, continuation of the downward movement of lever 26 will first cause a reaction of the surface of the platen against said tools 62, tending to tilt arms 42 upwardly; however, upward movement of said arms is prevented by segmental rib 46 against which abut rollers 63, the upper movement of said rib being opposed by spring 51. The initial further depression of carriage 34 and parts 37, 39, 44 carried thereby will therefore result in tools 62 becoming embedded to a certain extent within the resilient material of which platen 76 is composed as shown in Fig. 3.

At a certain point however, the resistance offered by platen 76 will become greater than that offered by the depression of spring 51 and at this point, further downward motion of carriage 30 caused by further downward motion of lever 26 will result in an angular motion in a counterclockwise direction of arms 42 in relation to their pivots 41, and consequent translatory inward motion in a radial direction of tools 62 along the middle line of the corresponding petal placed on platen 76, and movement of pressure member 44 towards member 37, against the action of spring 51.

As arms 42 are thus caused to move inwardly until lever 26 reaches its extreme downward position, pressure member 44 is forced towards plate 37 and through part 43 causes upward movement of plunger 53, movement of said plunger in this direction being unopposed as stated by cam acting dog 57.

When the downward stroke of lever 26 is completed, said lever is moved in the opposite direction, causing rotation of segment 27 in a counterclockwise direction and rotation of pinion 28 in a clockwise direction. This results in carriage 30 being moved upwardly in relation to frame 31 while arms 42 remain in their contracted position, return movement of member 44 to its normal position due to the pressure of spring 51 being checked by dog 57 bearing against surface 60 of plunger 53.

This is a necessary feature because if arms 42 were allowed to spring back they might get entangled in the curled petals and the work would be damaged.

When carriage 30 reaches the upper end of its stroke, the upper surface of rack 29 will strike against the lower end of screw 72 causing extension 35 of the lower end of plunger 34 to become disengaged from lug 36. In order to make this possible, the rear part 61 of cam acting dog 57 is provided with an opening 79 through which screw 72 may project, as will be understood.

As the upper surface of extension 35 strikes the lower surface of frame 31, outward sliding movement of carriage 30 in relation to said frame 31 becomes checked, so that pinion 28 becomes locked against rotation in relation to rack 29; however, since upon continuation of the upward movement of lever 26, pinion 28 is forced to rotate in a clockwise direction, carriage 30 together with parts carried thereby and together with holding frame 31 will rotate bodily about shaft 25 together with pinion 28; so that frame 31 will finally reach the rearwardly inclined position shown in Fig. 1.

At this point, as explained, part 67 of lever 68 will engage pin 70 and frame 31 and lever 26 will become locked against movement away from each other. At the same time, a lug 80 carried by lever 26 strikes against the rear end 61 of dog 57, depressing it against the action of spring 59 and thus freeing plunger 53.

Spring 51 becomes thus free to expand and will force pressure member 44 outwardly until stop 52 strikes the upper surface of carriage 30, at the same time causing arms 42 to spread to their normal positions and to remain directly exposed to the heat generated by the heating means provided for this purpose.

The release of dog 57 and plunger 53 is illustrated in Fig. 4, where lug 80 is shown striking the rear end 61 of dog 57 at the end of the upward stroke of lever 26.

Due to the weight of frame 31 and of the various parts carried thereby, the tendency of the same to tilt downwardly when freed by lock 67 necessitates the application of considerable pressure against lever 26 in order to cause said movement to take place while plunger 34 remains in its raised position; therefore, I prefer to provide said frame 31 with weight compensating means cooperating with the pressure exerted against handle 26 in opposing to a certain extent the rapid descent of frame 31.

For instance, the weight compensating means may consist of a spring 81 abutting against the surface of a bushing 82, carried by upright 21, and against the head 83 of a plunger 84 pivotally attached at the upper end to the rear surface of frame 31 as shown at 85. The stem portion of said plunger 84 slides through bushing 82, so that downward movement of frame 31 results in a gradual compression of spring 81.

In order to counterbalance the changes gradually taking place in the direction of plunger 84 due to the displacement of its point of attachment 85 however, bushing 82 is mounted on a horizontal pivot as will be understood.

The tension of spring 51 is adjusted according to the pressure to be exerted by tool 62 against the surface of the platen and according to the number of arms 42 used. The machine can be used with segmental blanks having different angular widths and different numbers of radially extending petals. Insofar as the petals are concerned, the position of arms 42 can be adjusted accordingly, by adjusting the position of brackets 39 along rim 38; and as to the angular extension of the blank to be acted upon, gauges 77, 78 are arranged for lateral and angular adjustment by means of links 86, 87, 86', 87', pivotally connected to said gauge members and adjustable to or from the central line of the machine by means of screws such as 88 inserted through slots 89.

A typical segmental blank 90 formed with a number of radial petals 91 is illustrated in Fig. 6. As stated during the course of the description before tools 62 initiate their inward radial travel, rollers 63 which act as rests therefor are closer to the axis of rim 38 than said tools 62. On the other hand, as tools 62 move inwardly, they reach a position which is closer to said axis than that of rollers 63, an intermediate position of tools 62, for instance, being illustrated in Fig. 5. Therefore, it will be apparent that the position of rollers 63 in relation to the axis of rim 38 is as close as possible to the intermediate vertical position of tools 62 associated therewith in order to equalize as much as possible the pressure exerted by spring 51 throughout the inward travel of tools 62.

It will be observed that the frictional contact between the surface of cam acting dog 57 and surface 60 of plunger 53 permits a certain amount of expansion of spring 15 before the plunger is actually locked in position by the cam acting dog; therefore the contacting surfaces may be subject to wear and therefore I prefer to make surface 60 of a softer metal than that of cam acting dog 57 and interchangeable by providing a removable lining 92 for the inner surface of plunger 53.

It is obvious, of course, that an absolutely positive locking arrangement may be used instead if preferred. The machine can also be made to operate on blanks extending around an entire circumference by providing a rotatable table as a support for a circular yielding or deformable platen.

Figures 7, 8:
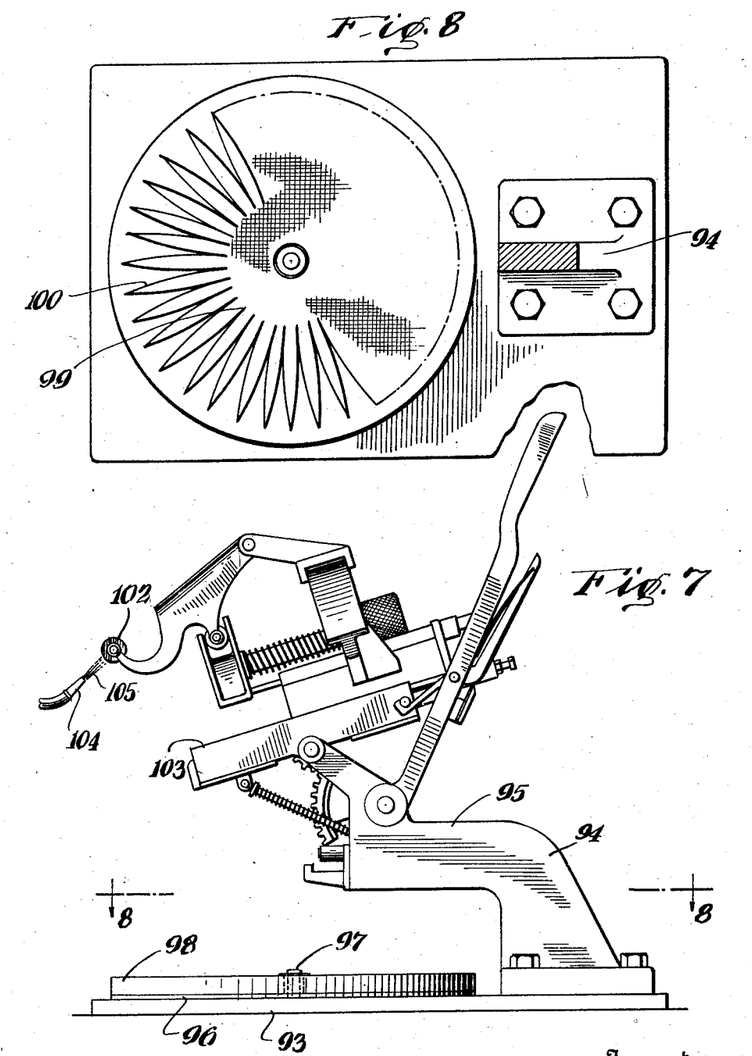
Fig. 7 is a side view in elevation of a slightly modified type of machine also embodying my invention.
Fig. 8 is a sectional plan of the same through line 8—8 of Fig. 7.

Such a modification is illustrated in Figs. 7, 8, where 93 designates the base of the machine, 94 an upright or stand of the goose neck type having an inward horizontal extension 95 carrying the movable parts and operating mechanism, and 96 designates a table rotatable about a pivot 97 on base 93 and supporting a yielding platen 98.

By referring to Fig. 8 it is seen that a blank 99 extending for the entire circumference and provided with a number of radial petals 100 can be placed on the platen, said blank being provided with a central opening 101 cooperating with pin 97 in positioning the blank.

The axis of pin 97 coincides with the axis of the circumference around which the tools 102 are arranged, and by providing for a suitable angular displacement of the platen each time the machine is operated, a new set of petals may be brought to the operative position. For instance, if the tools 105 extend for a 90° arc, the platen will have to be angularly displaced 90° each time the machine is operated, and after four operations the finished blank may be removed and a new blank inserted.

In Fig. 7, I illustrate the manner in which the heating of the tools may take place when the tilting frame 103 is in its inclined position, 104 designating burners directing flames 105 against the tools in said position.

In order to provide for the heating of the tools, at a position not interfering with the handling of the blanks being placed on the platen or removed therefrom, it is not absolutely necessary that an inclinable frame such as 31 be provided. For instance, in Figs. 9 and 10, I illustrate a device where the frame 106 is not tiltable but remains permanently set in a vertical position, being mounted on a stem 107 which is rotatable between two extreme angular positions on a vertical pivot 108.

As represented, the device may be locked in its working position by causing extension 109 of plunger 110 to interlock with a lug 111 which is fixed on the base 112. The operation of the actuating lever 113 will cause vertical displacement of the carriage 114 in relation to frame 106 as will be understood from the description of Figs. 1 to 5; but when carriage 114 has reached its extreme upward position, it will cause extension 109 to become disengaged from lug 111 and the entire device may be rotated 90° to a position where a stationary dog 114' mounted on a stand 115 will trip the locking dog 115', releasing the pressure member 116 and permitting spring 117 to cause the outward spreading of two carrying arms 118.

Figures 9, 10:
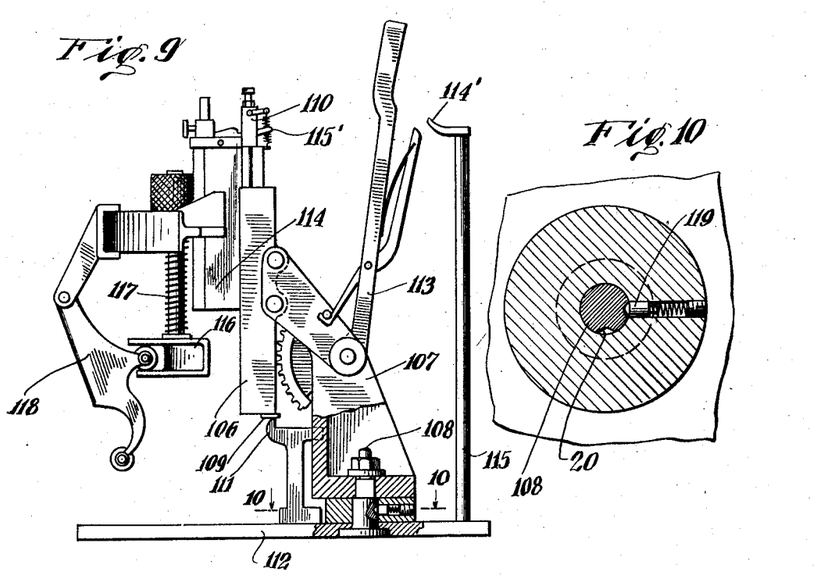
Fig. 9 is a side view in elevation of another machine embodying my invention in a still different form.
Fig. 10 is an enlarged plan sectional view of the same through line 10—10 of Fig. 9.

The two angular positions of stem 107 may be determined by a spring pin such as 119 cooperating with two angularly space depressions 120 provided in the stem of pivot 108 clearly illustrated in Fig. 10.

Figure 11:
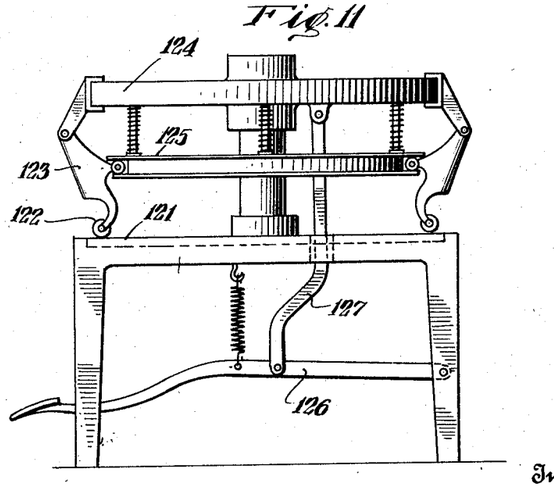
Fig. 11 is a side view in elevation of a still different type of machine also embodying my invention.

Other arrangements embodying my invention may be devised in various forms. For instance, in Fig. 11 I illustrate a treadle operated machine where a series of segmental blanks may be placed on a platen 121 to be acted upon simultaneously by a circumferential series of tools 122 carried by arms 123 mounted all around a circular plunger frame 124 in conjunction with a pressure member 125, said plunger frame 124 being connected to a treadle 126 by a connection 127 in a manner such as ordinarily employed in foot presses and like treadle operated machines.

From the foregoing description, it is apparent that the details of construction of my machine may vary from those shown without departing from the inventive idea; the drawings are therefore understood as being intended for illustrative purposes only and not in a limiting sense. Accordingly, I reserve myself the right to carry my invention into practice in all those ways and manners which may enter, fairly, into the scope of the appended claims.

I claim:

1. In a device of the character described, the combination with a platen, of a pivotally mounted tool arm movable to and from the surface of said platen in a plane at right angle thereto, means for forcing said tool arm against said platen, causing translatory movement of the end thereof bearing against said surface, along said surface, in the direction of said plane, means for simultaneously exerting pressure against said arm, opposing its pivotal and translatory movement, and means automatically locking said arm against return movement to its normal position at the ends of its working stroke.

2. In a device of the character described, the combination with a platen, of a pivotally mounted tool arm movable in a plane at right angles to the surface of said platen, means for forcing said tool arm against said platen, causing translatory movement of the end thereof bearing against said surface, along said surface, in the direction of said plane, means for simultaneously exerting pressure against said arm, opposing its pivotal and translatory movement, means automatically locking said arm against return movement to its normal position, at the end of its working stroke, and means for releasing said locking means.

3. In a device of the class described, the combination with a platen, of a plurality of tool arms arranged along a curve, said arms being pivotally mounted and movable on converging planes at right angles to said curve and platen, means for forcing said tool arms against said platen, causing inward translatory movement of the ends thereof bearing against the surface of said platen, along said surface, in the directions of said planes, means automatically locking said arms in their contracted position, and means for moving said arms away from said platen while in said contracted position.

4. In a device of the class described, the combination with a platen, of a plurality of tool arms arranged along a curve, said arms being pivotally mounted and movable on converging planes at right angles to said curve and platen, means for forcing said tool arms against said platen, causing inward translatory movement of the ends thereof bearing against the surface of said platen, along said surface, in the directions of said planes, means for simultaneously exerting pressure against said arms, opposing their pivotal and translatory movement, means automatically locking said arms in their contracted position, and means for moving said arms away from said platen while in said contracted position.

5. In a device of the class described, the combination with a platen, of a plurality of tool arms adjustably arranged along a curve, said arms being pivotally mounted and movable on converging planes at right angles to said curve and platen, means for forcing said tool arms against said platen, causing inward translatory movement of the ends thereof bearing against the surface of said platen, along said surface, in the directions of said planes, means for simultaneously exerting pressure against said arms, opposing their pivotal and translatory movement, means for regulating said pressure, means automatically locking said arms in their contracted position, and means for moving said arms away from said platen while in said contracted position.

6. In a device of the class described, the combination with a platen, of a frame, a carrier movable towards and away from said platen mounted on said frame, a plurality of tool arms adjustably arranged along a curve, pivotally mounted on said carrier, said arms being movable on converging planes at right angles to said curve and platen, means for moving said carrier towards said platen, causing inward translatory movement of the ends of said arms bearing against the surface thereof, along said surface, in the directions of said planes, means independent of said carrier moving means for retaining said arms in their contracted position, while said carrier is moved in the opposite direction, and means for releasing said arms when said carrier reaches a predetermined position.

7. In a device of the class described, the combination with a platen, of a frame, a carrier movable towards and away from said platen mounted on said frame, a plurality of tool arms adjustably arranged along a curve, pivotally mounted on said carrier, said arms being movable on converging planes at right angles to said curve and platen, means for moving said carrier towards said platen, causing inward translatory movement of the ends of said arms bearing against the surface thereof, along said surface, in the directions of said planes, means for regulating said pressure, means for automatically locking said arms in their contracted position said means retaining said arms in said position, while said carrier is moved in the opposite direction, and means for releasing said arms when said carrier reaches a predetermined position.

8. In a device of the class described, the combination with a platen, of a stand, a frame movably mounted on said stand, means for locking said frame in operative position, a carrier movable towards and away from said platen mounted on said frame, a plurality of tool arms arranged along a curve, pivotally mounted on said carrier, said arms being movable on converging planes at right angles to said curve and platen, means for moving said carrier towards said platen, causing inward translatory movement of the end of said arms bearing against the surface thereof, along said surface, in the directions of said planes, means for locking said arms in their contracted position said means retaining said arms in said position, while said carrier is moved in the opposite direction, means for releasing said frame, means for moving said frame to its normal position in relation to said stand and means for releasing said arms when said frame reaches a predetermined position.

9. In a device of the class described, the combination with a platen, of a stand, a frame, a carrier movable towards and away from said platen mounted on said frame, a plurality of tool arms arranged along a curve, pivotally mounted on said carrier, said arms being movable on converging planes at right angles to said curve and platen, means for moving said carrier towards said platen, causing inward translatory movement of the ends of said arms bearing against the surface thereof, along said surface, in the directions of said planes, means for simultaneously exerting pressure against said arms, opposing their pivotal and translatory movement, means for locking said arms in their contracted position said means retaining said arms in said position, while said carrier is moved in the opposite direction, means for releasing said frame, means for moving said frame to its normal position in relation to said stand, and means for releasing said arms when said frame reaches a predetermined position.

10. In a device of the class described, the combination, with a platen, of a frame, a carrier movable towards and away from said platen mounted on said frame, a plurality of tool arms arranged along a curve, pivotally mounted on said carrier, said arms being movable on converging planes at right angles to said curve and platen, means for moving said carrier towards said platen, causing inward translatory movement of the ends of said arms bearing against the surface thereof, along said surface, in the directions of said planes, means for regulating said pressure, means automatically locking said arms in their contracted position said means retaining said arms in said position, while said carrier is moved in the opposite direction, means for releasing said arms when said carrier reaches a predetermined position, and a single operating member causing the operation of said elements in the proper sequence.

11. In a device of the class described, the combination with a platen, of a stand, a frame movably mounted on said stand, means for locking said frame in operative position, a carrier movable towards and away from said platen mounted on said frame, a plurality of tool arms arranged along a curve, pivotally mounted on said carrier, said arms being movable on converging planes at right angles to said curve and platen, means for moving said carrier towards said platen, causing inward translatory movement of the ends of said arms bearing against the surface thereof, along said surface, in the directions of said planes, means automatically locking said arms in their contracted position said means retaining said arms in said position, while said carrier is moved in the opposite direction, means for releasing said frame, means for moving said frame to its normal position in relation to said stand, means for releasing said arms when said frame reaches a predetermined position, and a single operating member causing the operation of said elements in the proper sequence.

12. In a device of the class described, the combination with a platen, a stand, a frame pivotally mounted on said stand, and a tool carrier comprising a rack slidably mounted on said frame, of a pinion in mesh with said rack, copivotal with said frame, means for locking said frame in its operative position, means for releasing said frame when said carrier has reached a predetermined position in relation thereto, and means for rotating said pinion, causing sliding movement of said carrier when said frame is in its locked position, and tilting movement of said frame when in its unlocked position.

13. In a device of the class described, the combination with a platen, of a stand, a frame pivotally mounted on said stand, movable from an operative position at right angles to said platen to an inclined position in relation thereto, a tool carrier comprising a rack slidably mounted on said frame, a plurality of tool arms arranged along a curve, pivotally mounted on said carrier, said arms being movable on converging planes at right angles to said curve, a pinion in mesh with said rack, copivotal with said frame, means for locking said frame in its operative position, means for rotating said pinion causing sliding movement of said carrier when said frame is in its locked position, and causing inward translatory movement of the ends of said arms bearing against the surface of said platen, along said surface in the directions of said planes, when said carrier is moved towards said platen, means associated with said carrier for simultaneously exerting pressure against said arms, opposing their pivotal and translatory movement, means for retaining said pressure exerting means and tool arms in their contracted position, means for releasing said frame when said carrier has reached a predetermined position in its travel away from said platen, permitting tilting movement thereof, means for operating said pinion, and means for releasing said pressure exerting means and arms when said frame reaches a predetermined position.

14. In a device of the class described, the combination with a platen, of a stand, a frame pivotally mounted on said stand, movable from an operative position at right angles to said platen to an inclined position in relation thereto, a tool carrier comprising a rack slidably mounted on said frame, a plurality of tool arms arranged along an arc, pivotally mounted on said carrier, said arms being movable on converging planes at right angles to said arc, means for adjusting the relative position of said arms along said arc, a pinion in mesh with said rack, copivotal with said frame, means for locking said frame in its operative position, means for rotating said pinion causing sliding movement of said carrier when said frame is in its locked position, and causing inward translatory movement of the ends of said arms bearing against the surface of said platen, along said surface in the directions of said planes, when said carrier is moved towards said platen, spring means associated with said carrier for simultaneously exerting pressure against said arms, opposing their pivotal and translatory movement, means for adjusting the pressure exerted thereby, means for retaining said pressure exerting means and tool arms in their contracted position, means for releasing said frame when said carrier has reached a predetermined position in its travel away from said platen, permitting tilting movement thereof, means for operating said pinion, means for releasing said pressure exerting means and arms when said frame reaches a predetermined position, and means for retaining said frame in said position.

GIUSEPPE BONTEMPI.